July 15, 1947.  J. M. BOBELDYK  2,424,014
EASY DRIVE SWEEP
Filed Dec. 28, 1945
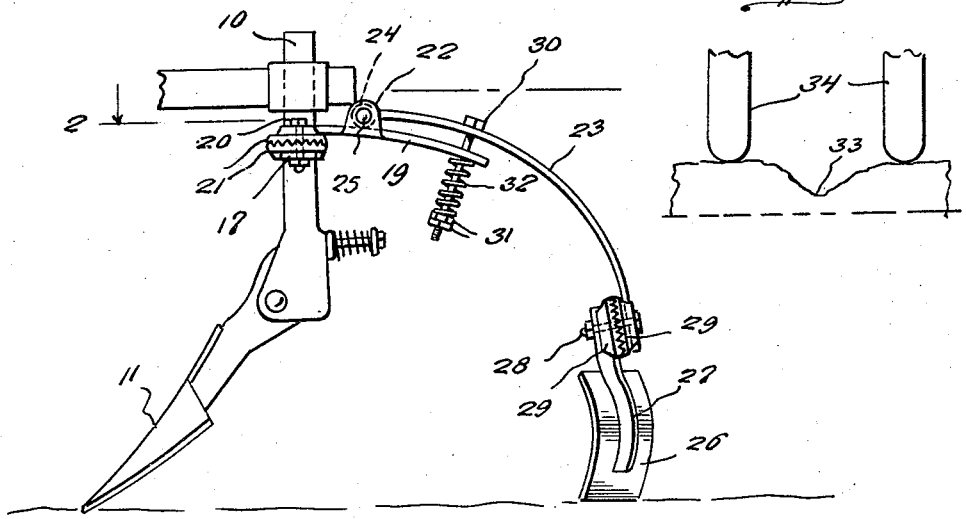
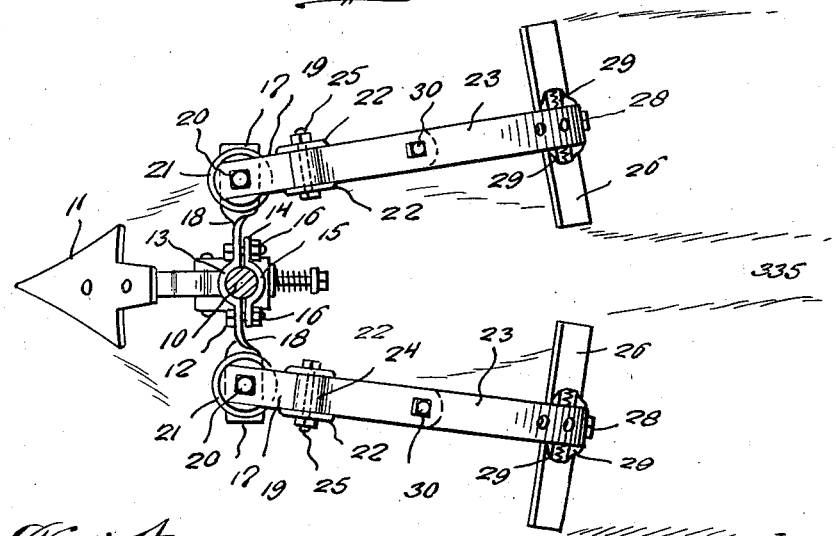
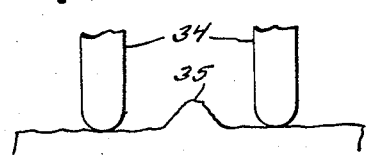
Inventor
John M. Bobeldyk,
By
Attorneys Patented July 15, 1947

2,424,014

UNITED STATES PATENT OFFICE 2,424,014

EASY DRIVE SWEEP

John M. Bobeldyk, Inwood, Iowa

Application December 28, 1945, Serial No. 637,522

1 Claim. (Cl. 97—56)

My invention relates to agricultural implements and more particularly to an attachment for a cultivator.

The object of my invention is to provide an attachment for a cultivator for the purpose of facilitating the work of cultivating when a cultivator is driven the second time through the rows of corn, beans and the like, by eliminating the shovel grooves left by the cultivator when working without the attachment forming the subject matter of my invention.

Another object of my invention is to provide an attachment for forming ridges in place of the shovel grooves left by the cultivator, so that steering of the cultivator during subsequent cultivating operations will be facilitated.

A further object of my invention is to provide such an attachment that will fit all makes of tractor cultivators.

Other objects of my invention may appear in the following specification describing my invention with reference to the accompanying drawing illustrating a preferred embodiment of my invention. It is however, to be understood that my invention is not to be restricted or limited to the exact construction and combination of parts described in the specification and shown in the drawing but that such changes and modifications can be made which fall within the scope of the claim appended hereto.

In the drawing:

Figure 1 is a side view of an easy drive sweep attached to the rear center cultivator shank of a tractor cultivator.

Figure 2 is a top view of Figure 1.

Figure 3 is a diagrammatic view of the front wheels of a tractor cultivator straddling a shovel groove left by a cultivator, and Figure 4 shows diagrammatically how the front wheels of a tractor cultivator straddle a ridge formed by an easy drive sweep attachment.

Referring now to the drawing in detail, that portion of a tractor cultivator is shown which is used for the purpose of attaching the easy drive sweep. This portion of the cultivator includes the rear center cultivator shank 10 supporting the cultivator shovel 11. A clamp plate 12 has a curved center portion 13 shaped so that it fits onto the shank 10. A second clamp member 14 has also a curved middle portion 15 fitting onto the shank 10. Bolts 16 clamp the plate 12 and member 14 together and into firm attachment with said shank. The ends 17 of the clamp plate 12 extend beyond the ends of the clamp member 14 and are twisted at a ninety degree angle relative to the middle portion as clearly shown at 18 in Figure 1. A curved arm 19 is pivotally fastened on top of each end part 17 of the clamp plate 12 by means of a bolt 20. Two serrated washers 21 are arranged on each of the bolts 20 between the end part 17 and the arm 19 so that the serrations of said washers will engage each other to secure the arms 19 in any selected angular position in relation to each other.

Intermediate the ends of each arm 19 two oppositely arranged lugs 22 are formed on the longitudinal edges of each arm 19 and extend upwardly thereof. Two curved supports 23 have each an eye 24 on their forward ends which fits freely between the lugs 22, and a bolt 25 extending through each pair of lugs and the eye between them swingingly secures the corresponding support 23 to the arm 19.

To each support 23 a scraper blade or sweep 26 is adjustably fastened. The scraper or sweep is curved downwardly and has an elongated shape. An arm 27 is rigidly fastened centrally of each sweep 26, and a bolt 28 extends through each support 23 adjacent its rear end and through the free end of the corresponding arm 27. Between each arm 27 and support 23 a pair of serrated washers 29 is arranged on each bolt 28 to secure the sweep 26 in adjusted position.

A bolt 30 extends through a hole in each curved arm 19 adjacent its free end and through the corresponding support 23. Two lock nuts 31 are arranged on each bolt 30. A spring 32 is placed on each bolt 30 between arm 19 and nuts 31.

When a tractor cultivator is being used the cultivator shovels 12 leave a groove 33 in the ground, and when the corn or the like is to be worked again the front wheels 34 of the tractor cultivator must straddle this groove. Since these wheels have the tendency to crowd into said groove the repeat cultivating operation includes hard work in steering the cultivator. The use of the easy drive sweep of my invention eliminates this trouble.

When the easy drive sweep is firmly attached to the rear center cultivator shank 11 by means of the clamp 12—14 the angular position of the sweeps 26 can be adjusted by first loosening the bolts 20 and 28, setting the sweeps into the desired position and tightening said bolts. The sweeps will now engage the soil in back of the cultivator shovels and sweep it together forming a ridge 35. By the repeat cultivator operation the front wheels 34 will then ride on even ground straddling the ridge 35 as diagrammatically shown in Figure 4.

In case a sweep 26 should encounter a rock or a stump or the like the arrangement of spring 32 will permit the sweep to ride over the said obstacle and will prevent breakage.

Having described my invention, what I claim and desire to secure by Letters Patent is:

An attachment for a tractor cultivator, having shovels on its rear end supported by shanks including a pair of rearwardly extending arms, a support hingedly conneced to each arm and adapted to swing in a vertical plane, a soil scraper on each support arranged behind the shovels to scrape the soil toward the longitudinal center of said cultivator, and a spring on each set formed by one arm and one support adapted to normally prevent the support from swinging in relation to the arm, but to permit such movement when the attached soil scraper meets a heavy obstacle.

JOHN M. BOBELDYK.

REFERENCES CITED

The following references are of record in the file of this patent:

UNITED STATES PATENTS

| Number | Name | Date |
|---|---|---|
| 1,084,307 | Altgelt | Jan. 13, 1914 |
| 937,778 | Dunsha | Oct. 26, 1909 |
| 1,939,958 | Dias | Dec. 19, 1933 |
| 1,366,915 | Knorr | Feb. 1, 1921 |
| 1,118,089 | Willis | Nov. 24, 1914 |